(12) United States Patent
Sung (10) Patent No.: US 8,850,559 B2
(45) Date of Patent: Sep. 30, 2014

(54) SECURITY METHOD OF A PORTABLE DEVICE

(75) Inventor: Fang-Yuan Sung, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 91 days.

(21) Appl. No.: 13/316,566

(22) Filed: Dec. 12, 2011

(65) Prior Publication Data

US 2013/0086672 A1     Apr. 4, 2013

(30) Foreign Application Priority Data

Sep. 30, 2011   (TW) .............................. 100135646 A (51) Int. Cl.
*G06F 9/00* (2006.01)
*G06F 7/04* (2006.01)
*G06F 21/00* (2013.01)
*G08B 21/00* (2006.01)
*G11C 7/00* (2006.01)
*G06F 21/88* (2013.01)
*G06F 21/31* (2013.01)

(52) U.S. Cl.
CPC . *G06F 21/31* (2013.01); *G06F 9/00* (2013.01); *G06F 21/88* (2013.01); *G06F 21/00* (2013.01)
USPC .................... 726/18; 726/2; 726/9; 705/55

(58) Field of Classification Search
CPC ............ G06F 9/00; G06F 7/04; G06F 21/00; G08B 21/00; G11C 7/00
USPC ...................... 726/2, 9, 18; 705/55
See application file for complete search history.

(56) References Cited

U.S. PATENT DOCUMENTS 5,537,544 A  *  7/1996  Morisawa et al. ............... 726/19
2007/0113277 A1 *  5/2007  Chiang ........................... 726/18

OTHER PUBLICATIONS

Office action mailed on May 12, 2014 for the Taiwan application number 100135646, filing date: Sep. 30, 2011, p. 1 line 12-14, pp. 2-6 and p. 7 line 1-2.

* cited by examiner

*Primary Examiner* — Jeffrey Pwu
*Assistant Examiner* — Samuel Ambaye
(74) *Attorney, Agent, or Firm* — Winston Hsu; Scott Margo (57) ABSTRACT

An application program of the portable device receives a command of an owner when the portable device is powered on. The application program notifies a basic input/output system to set a protection variable, and notifies the owner to set a password in a setup menu of the basic input/output system after the application program receives the command of the owner. A keyboard controller turns off the portable device to enable the protection variable after the basic input/output system sets the protection variable and the setup menu of the basic input/output system stores the password. After the protection variable is enabled, whenever the portable device is powered on, the basic input/output system checks a password inputted to the portable device at least once and the basic input/output system executes a corresponding operation according to a check result.

17 Claims, 6 Drawing Sheets

SECURITY METHOD OF A PORTABLE DEVICE

BACKGROUND OF THE INVENTION

1. Field of the Invention

The present invention is related to a security method of a portable device, and particularly to a security method of a portable device that utilizes a stolen flag set in a battery of the portable device or a lock flag set in a read-only memory to ensure the portable device is not powered on by a present user.

2. Description of the Prior Art

In the prior art, an owner of a portable device can enable a security function of the portable device through an application program stored in an operation system of the portable device. That is to say, the owner first sets a password of the portable device in a setup menu of a basic input/output system of the portable device. After the owner sets the password of the portable device in the setup menu of the basic input/output system, the basic input/output system can notify a keyboard controller to turn off the portable device to enable the security function of the portable device. After the security function of the portable device is enabled, the basic input/output system of the portable device can determine whether a password inputted to the portable device is correct and execute a corresponding operation according to a check result whenever the portable device is powered on. That is to say, when a password inputted to the portable device is correct, the basic input/output system can notify the operation system to perform a normal boot sequence according to boot sequence setting values stored in the basic input/output system; when a wrong password is inputted to the portable device more than a predetermined number of times, the basic input/output system can notify the keyboard controller to turn off the portable device.

In the prior art, after the security function of the portable device is enabled, the basic input/output system of the portable device can determine whether a password inputted to the portable device is correct. Meanwhile, the portable device supplies power to the basic input/output system, which means that probability of the portable device being cracked is increased. Therefore, the security method of the portable device provided by the prior art is not a good security method for the owner of the portable device.

SUMMARY OF THE INVENTION

An embodiment provides a security method of a portable device. The security method includes an application program of the portable device receiving a command of an owner when the portable device is powered on; the application program notifying a basic input/output system to set a protection variable in a read-only memory, and notifying the owner to set a password in a setup menu of the basic input/output system after the application program receives the command of the owner; a keyboard controller turning off the portable device to enable the protection variable after the basic input/output system sets the protection variable in the read-only memory and the setup menu of the basic input/output system stores the password; the basic input/output system checking a password inputted to the portable device at least once and the basic input/output system executing a corresponding operation according to a check result whenever the portable device is powered on after the protection variable is enabled.

The present invention provides a security method of a portable device. The security method first enables a protection variable of a read-only memory of a basic input/output system. After the protection variable is enabled, the basic input/output system checks a password inputted to the portable device at least once whenever the portable device is powered on. When a check result shows wrong passwords inputted to the portable device a predetermined number of times, the basic input/output system notifies a keyboard controller to set a stolen flag in a memory of a battery of the portable device, or when a check result shows wrong passwords inputted to the portable device a predetermined number of times, the basic input/output system sets a lock flag in the read-only memory. After the keyboard controller sets the stolen flag in the memory of the battery of the portable device, the keyboard controller neglects a boot signal of a power button according to the stolen flag stored in the memory of the battery, or after the basic input/output system sets the lock flag in the read-only memory, the basic input/output system notifies the keyboard controller to disable a discharge mode of the battery of the portable device, and the basic input/output system notifies the keyboard controller to turn off the portable device according to the lock flag. Therefore, the present invention can ensure that the portable device is not powered on by a present user to secure data stored in the portable device when the portable device is in a stolen mode.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
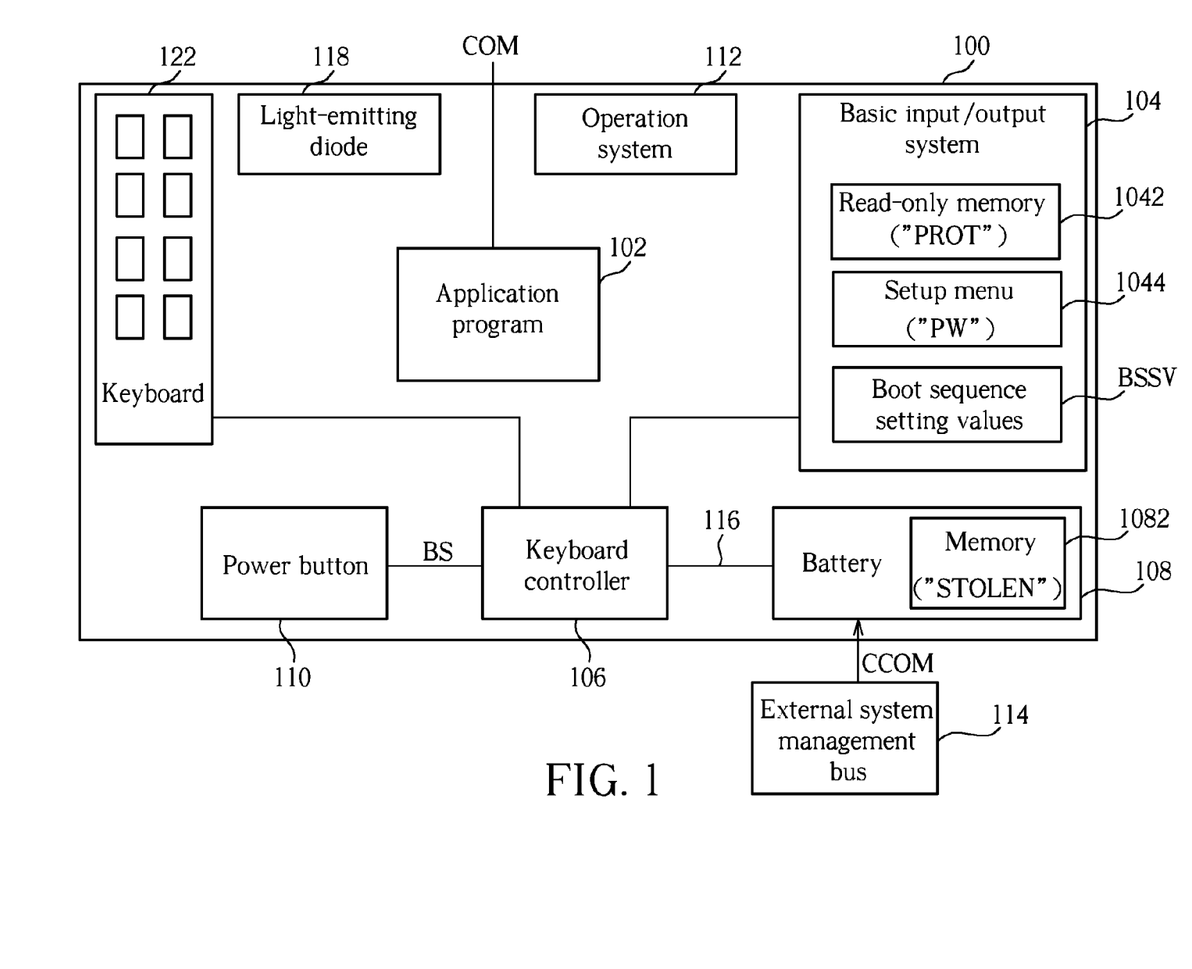
FIG. 1 is a diagram illustrating a portable device.

Please refer to FIG. 1. FIG. 1 is a diagram illustrating a portable device 100. The portable device 100 includes an application program 102, a basic input/output system 104, a keyboard controller 106, a battery 108, a power button 110, and an operation system 112, where the basic input/output system 104 includes a read-only memory 1042, a setup menu 1044, and boot sequence setting values BSSV. After the application program 102 receives a command COM of an owner of the portable device 100, the application program 102 notifies the basic input/output system 104 to set a protection variable "PROT" in the read-only memory 1042, and notifies the owner to set a password "PW" in the setup menu 1044 of the basic input/output system 104. After the basic input/output system 104 sets the protection variable "PROT" in the read-only memory 1042 and the setup menu 1044 of the basic input/output system 104 stores the password "PW", the keyboard controller 106 turns off the portable device 100 to enable the protection variable "PROT". In addition, the portable device 100 is a notebook, a tablet computer, a smart phone, or a personal digital assistant.

Figure 2:
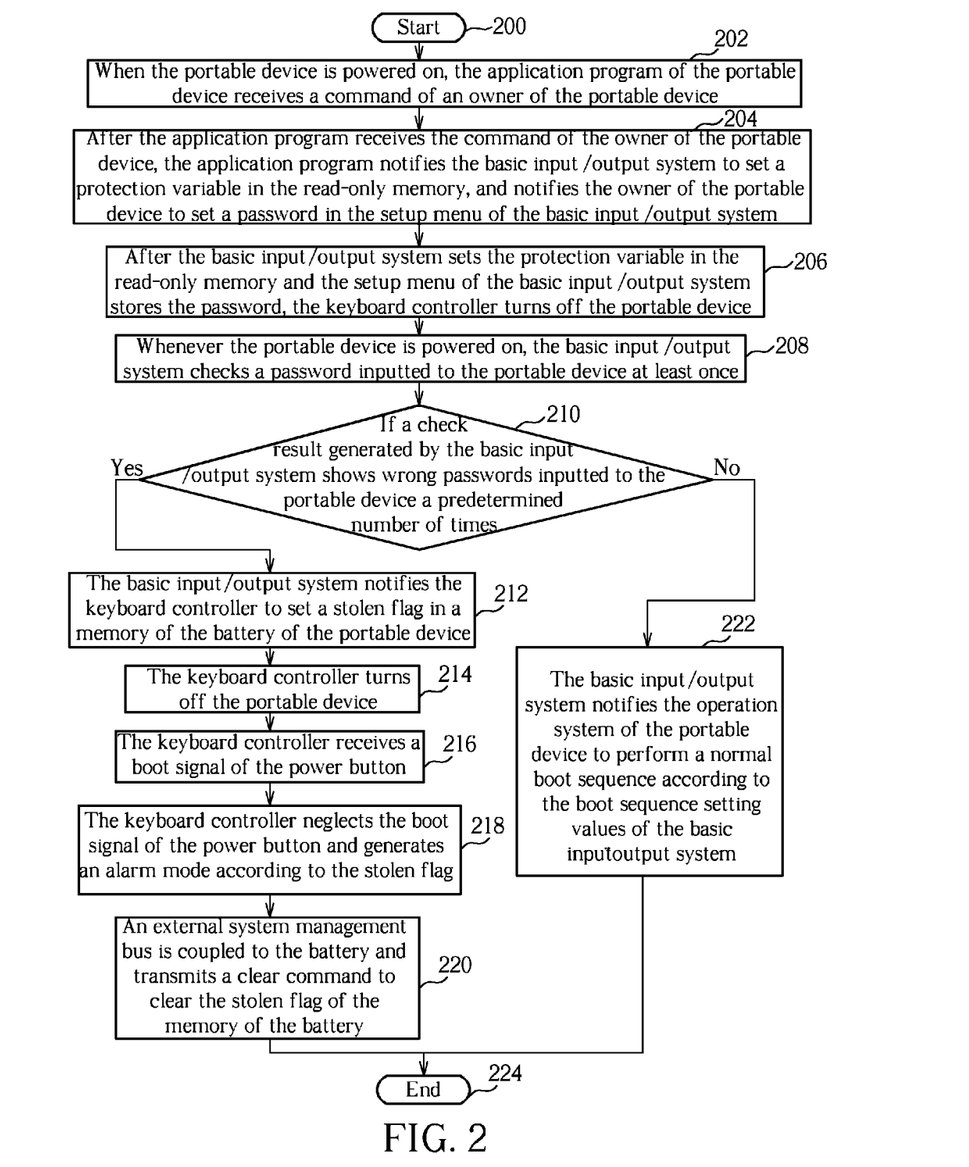
FIG. 2 is a flowchart illustrating a security method of a portable device according to an embodiment.

Please refer to FIG. 2. FIG. 2 is a flowchart illustrating a security method of a portable device according to an embodiment. The method in FIG. 2 is illustrated using the portable device 100 in FIG. 1. Detailed steps are as follows:

Step 200: Start.

Step 202: When the portable device 100 is powered on, the application program 102 of the portable device 100 receives a command COM of an owner of the portable device 100.

Step 204: After the application program 102 receives the command COM of the owner of the portable device 100, the application program 102 notifies the basic input/output system 104 to set a protection variable "PROT" in the read-only memory 1042, and notifies the owner of the portable device 100 to set a password "PW" in the setup menu 1044 of the basic input/output system 104.

Step 206: After the basic input/output system 104 sets the protection variable "PROT" in the read-only memory 1042 and the setup menu 1044 of the basic input/output system 104 stores the password "PW", the keyboard controller 106 turns off the portable device 100.

Step 208: Whenever the portable device 100 is powered on, the basic input/output system 104 checks a password inputted to the portable device 100 at least once.

Step 210: If a check result generated by the basic input/output system 104 shows wrong passwords inputted to the portable device 100 a predetermined number of times, go to Step 212; otherwise, go to Step 222.

Step 212: The basic input/output system 104 notifies the keyboard controller 106 to set a stolen flag "STOLEN" in a memory 1082 of the battery 108 of the portable device 100.

Step 214: The keyboard controller 106 turns off the portable device 100.

Step 216: The keyboard controller 106 receives a boot signal BS of the power button 110.

Step 218: The keyboard controller 106 neglects the boot signal BS of the power button 110 and generates an alarm mode according to the stolen flag "STOLEN".

Step 220: An external system management bus 114 is coupled to the battery 108 and transmits a clear command CCOM to clear the stolen flag "STOLEN" of the memory 1082 of the battery 108; go to Step 224.

Step 222: The basic input/output system 104 notifies the operation system 112 of the portable device 100 to perform a normal boot sequence according to the boot sequence setting values BSSV of the basic input/output system 104; go to Step 224.

Step 224: End.

Figure 3:
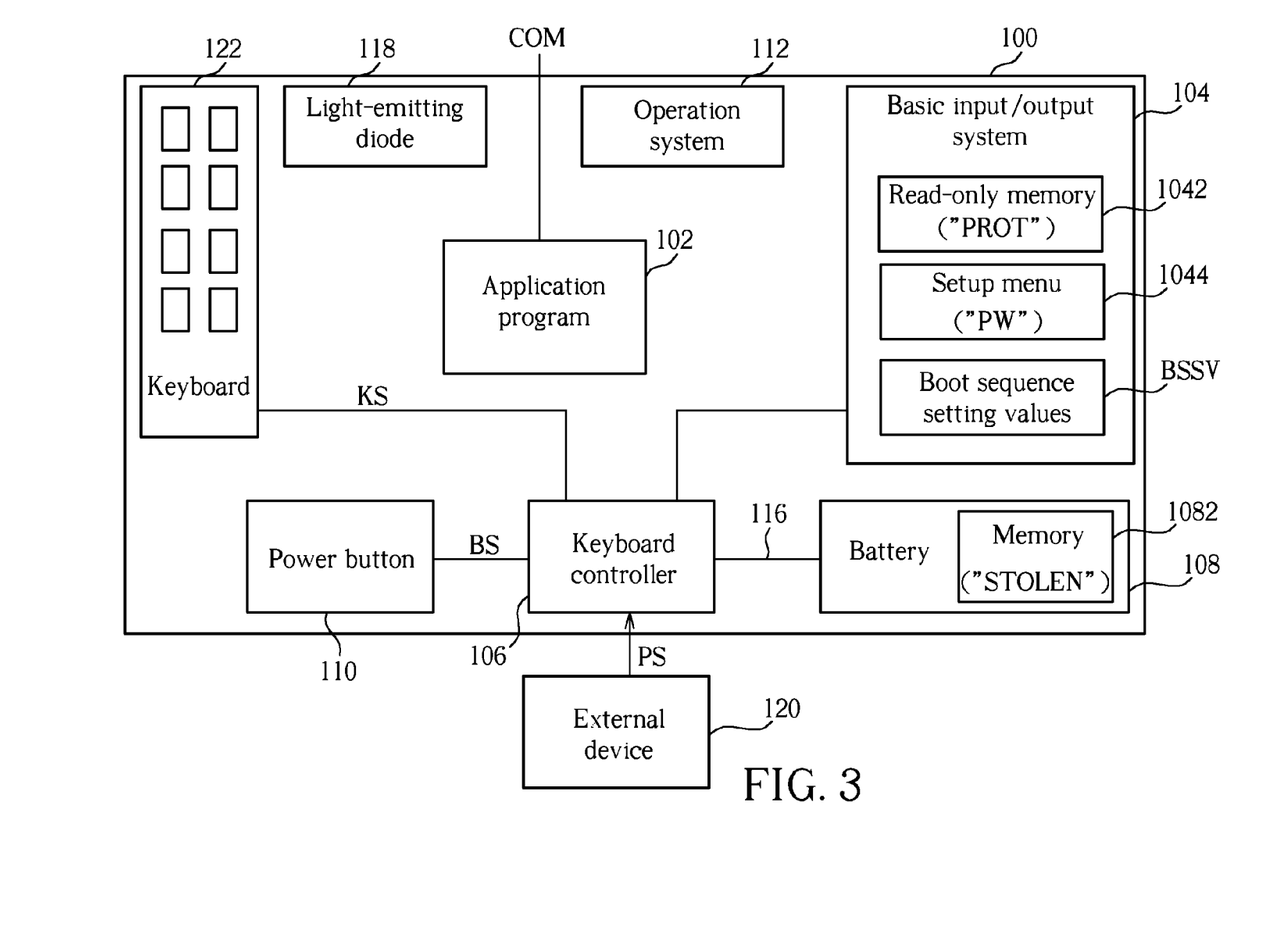
FIG. 3 is a diagram illustrating the service staff of the customer service center clearing the stolen flag of the memory of the battery according to another embodiment.

In Step 204, the basic input/output system 104 includes the read-only memory 1042. In Step 212, the memory 1082 of the battery 108 is a flash memory. But, the present invention is not limited to the memory 1082 of the battery 108 being a flash memory. In Step 206, after the basic input/output system 104 sets the protection variable "PROT" in the read-only memory 1042 and the setup menu 1044 of the basic input/output system 104 stores the password "PW", the keyboard controller 106 turns off the portable device 100 to enable the protection variable "PROT". That is to say, a security function of the portable device 100 is enabled. In Step 208, after the protection variable "PROT" is enabled, the basic input/output system 104 checks a password inputted to the portable device 100 at least once according to the protection variable "PROT" and the password "PW" whenever the portable device 100 is powered on. In Step 210, the owner can set a predetermined number of times according to a practical requirement, such as three times. But, the present invention is not limited to the predetermined number of times being three times. In Step 212, when the check result of the basic input/output system 104 shows that wrong passwords have been inputted to the portable device 100 three times, the basic input/output system 104 notifies the keyboard controller 106 to set the stolen flag "STOLEN" in the memory 1082 of the battery 108 of the portable device 100 according to the check result. That is to say, the keyboard controller 106 sets the stolen flag "STOLEN" in the memory 1082 of the battery 108 of the portable device 100 through a system management bus 116 of the portable device 100. In Step 214, the keyboard controller 106 turns off the portable device 100 to enable the stolen flag "STOLEN". In Step 216 and Step 218, after the stolen flag "STOLEN" is enabled, when the keyboard controller 106 receives the boot signal BS of the power button 110, the keyboard controller 106 neglects the boot signal BS of the power button 110, does not power on the portable device 100, and generates the alarm mode to show a present user of the portable device 100 that the portable device 100 is in a stolen mode according to the stolen flag "STOLEN". The alarm mode activates special sound effects generated by the portable device 100 and/or a light-emitting diode 118 further included by the portable device 100 flashed by the portable device 100. Because the keyboard controller 106 neglects the boot signal BS of the power button 110 according to the stolen flag "STOLEN", the present user of the portable device 100 does not power on the portable device 100. That is to say, the present user of the portable device 100 can not utilize the portable device 100. But, the present invention is not limited to the alarm mode activating the special sound effects generated by the portable device 100 and/or the portable device 100 flashing the light-emitting diode 118. In Step 220, the owner of the portable device 100 can send the portable device 100 to a customer service center to clear the stolen flag "STOLEN" of the memory 1082 of the battery 108. That is to say, a service staff of the customer service center can couple the external system management bus 114 to the battery 108, and transmits the clear command CCOM through the external system management bus 114 to clear the stolen flag "STOLEN" of the memory 1082 of the battery 108. Thus, after the stolen flag "STOLEN" is cleared, the basic input/output system 104 can notify the operation system 112 of the portable device 100 to perform the normal boot sequence according to the boot sequence setting values BSSV of the basic input/output system 104 when the keyboard controller 106 receives a boot signal BS of the power button 110 next time. Please refer to FIG. 3. FIG. 3 is a diagram illustrating the service staff of the customer service center clearing the stolen flag "STOLEN" of the memory 1082 of the battery 108 according to another embodiment. As shown in FIG. 3, the service staff of the customer service center can plug an external device 120 into at least one pin coupled to the keyboard controller 106 for a predetermined time T. Then, the keyboard controller 106 can transmit a clear command CCOM to the battery 108 to clear the stolen flag "STOLEN" of the memory 1082 of the battery 108 according to a signal PS of the at least one pin within the predetermined time T, where the external device 120 can be a Universal Serial Bus device. But, the present invention is not limited to the external device 120 being a Universal Serial Bus device. In addition, as shown in FIG. 3, in another embodiment of the present invention, the service staff of the customer service center can plug the external device 120 into at least one pin coupled to the keyboard controller 106 for a predetermined time T. Then, the keyboard controller 106 can transmit a clear command CCOM to the battery 108 to clear the stolen flag "STOLEN" of the memory 1082 of the battery 108 according to a signal PS of the at least one pin within the predetermined time T and a signal KS of at least one key of a keyboard 122 further included by the portable device 100.

Figure 4:
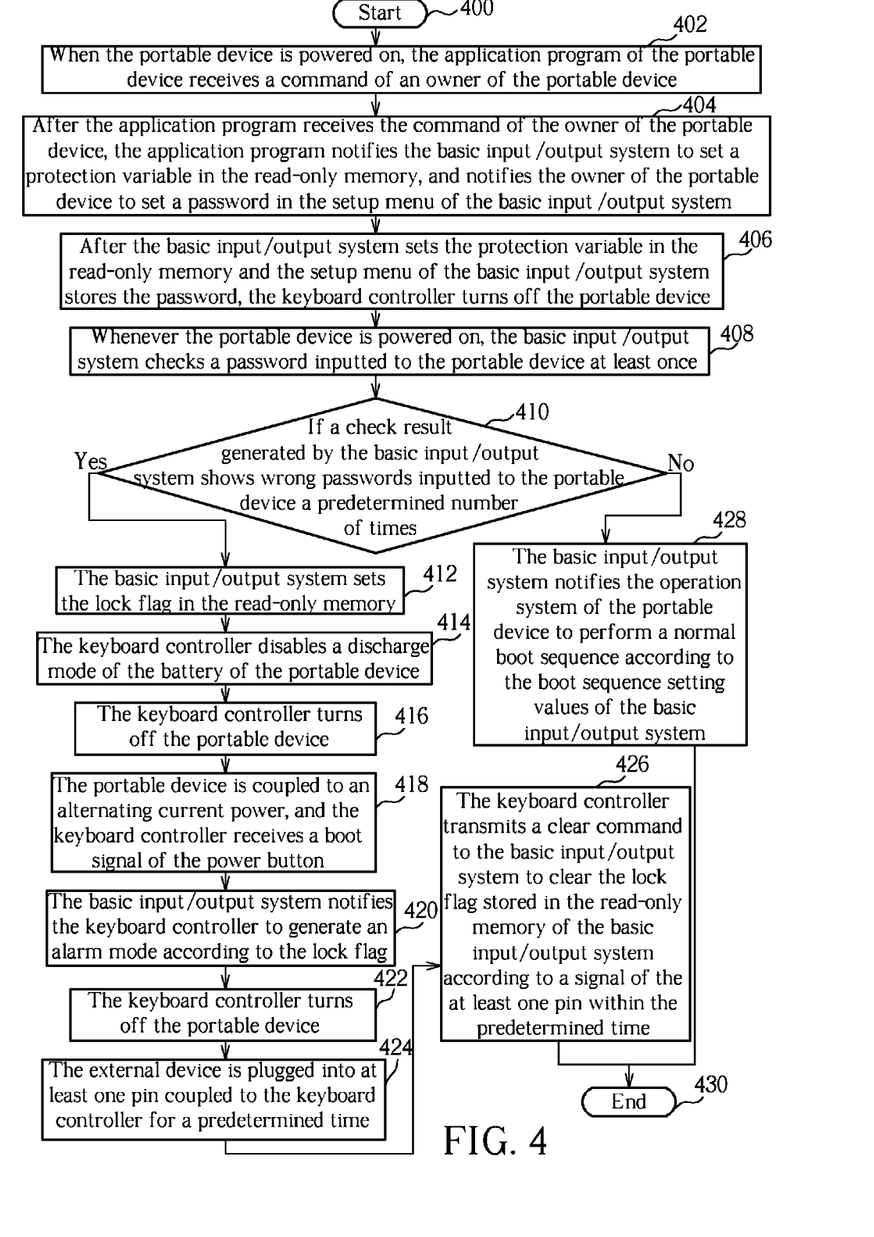
FIG. 4 is a flowchart illustrating a security method of a portable device according to another embodiment
Figure 5:
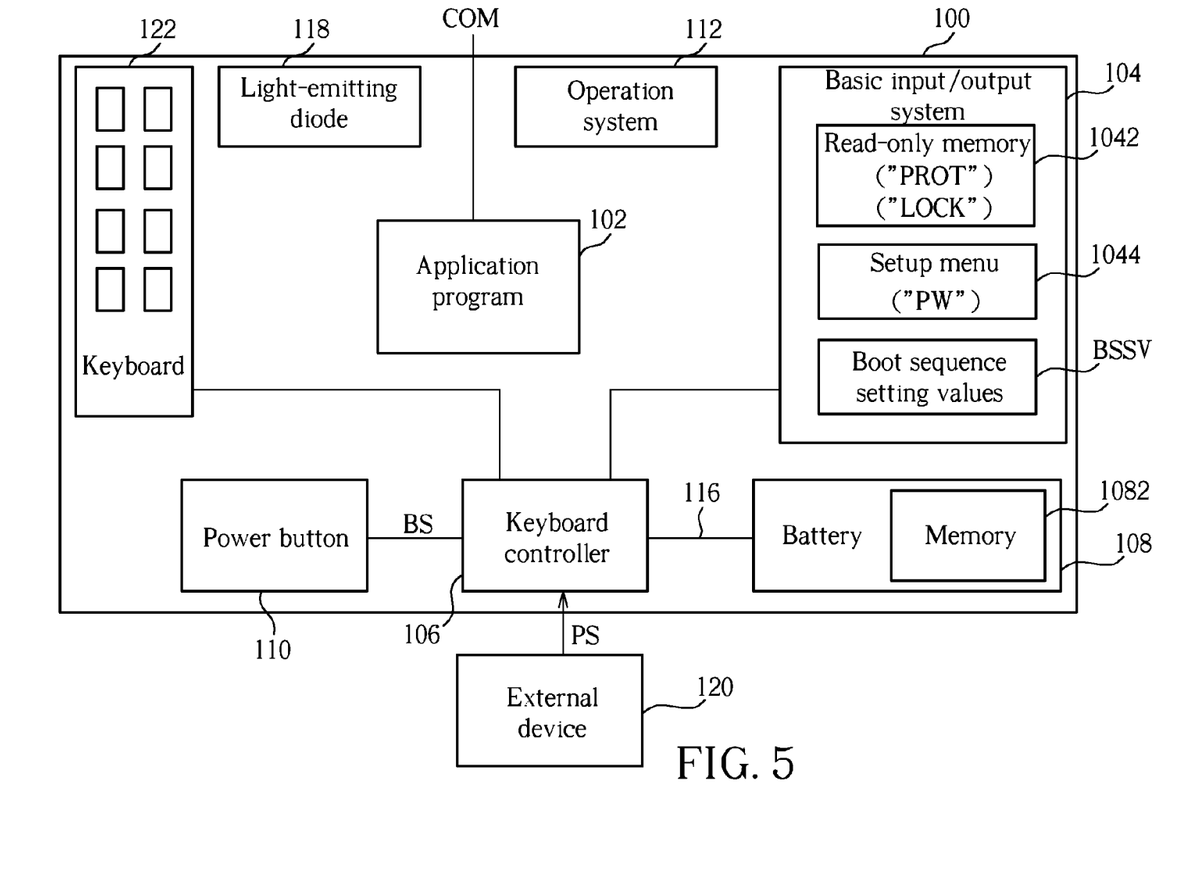
FIG. 5 is a diagram illustrating the basic input/output system setting a lock flag in the read-only memory.

Please refer to FIG. 4 and FIG. 5. FIG. 4 is a flowchart illustrating a security method of a portable device according to another embodiment, and FIG. 5 is a diagram illustrating the basic input/output system 104 setting a lock flag "LOCK" in the read-only memory 1042. The method in FIG. 4 is illustrated using the portable device 100 in FIG. 1. Detailed steps are as follows:

Step 400: Start.

Step 402: When the portable device 100 is powered on, the application program 102 of the portable device 100 receives a command COM of an owner of the portable device 100.

Step 404: After the application program 102 receives the command COM of the owner of the portable device 100, the application program 102 notifies the basic input/output system 104 to set a protection variable "PROT" in the read-only memory 1042, and notifies the owner of the portable device 100 to set a password "PW" in the setup menu 1044 of the basic input/output system 104.

Step 406: After the basic input/output system 104 sets the protection variable "PROT" in the read-only memory 1042 and the setup menu 1044 of the basic input/output system 104 stores the password "PW", the keyboard controller 106 turns off the portable device 100.

Step 408: Whenever the portable device 100 is powered on, the basic input/output system 104 checks a password inputted to the portable device 100 at least once.

Step 410: If a check result generated by the basic input/output system 104 shows wrong passwords inputted to the portable device 100 a predetermined number of times, go to Step 412; otherwise, go to Step 428.

Step 412: The basic input/output system 104 sets the lock flag "LOCK" in the read-only memory 1042.

Step 414: The keyboard controller 106 disables a discharge mode of the battery 108 of the portable device 100.

Step 416: The keyboard controller 106 turns off the portable device 100.

Step 418: The portable device 100 is coupled to an alternating current power, and the keyboard controller 106 receives a boot signal BS of the power button 110.

Step 420: The basic input/output system 104 notifies the keyboard controller 106 to generate an alarm mode according to the lock flag "LOCK".

Step 422: The keyboard controller 106 turns off the portable device 100.

Step 424: The external device 120 is plugged into at least one pin coupled to the keyboard controller 106 for a predetermined time T.

Step 426: The keyboard controller 106 transmits a clear command CCOM to the basic input/output system 104 to clear the lock flag "LOCK" stored in the read-only memory 1042 of the basic input/output system 104 according to a signal PS of the at least one pin within the predetermined time T; go to Step 430.

Step 428: The basic input/output system 104 notifies the operation system 112 of the portable device 100 to perform a normal boot sequence according to the boot sequence setting values BSSV of the basic input/output system 104; go to Step 430.

Step 430: End.

Figure 6:
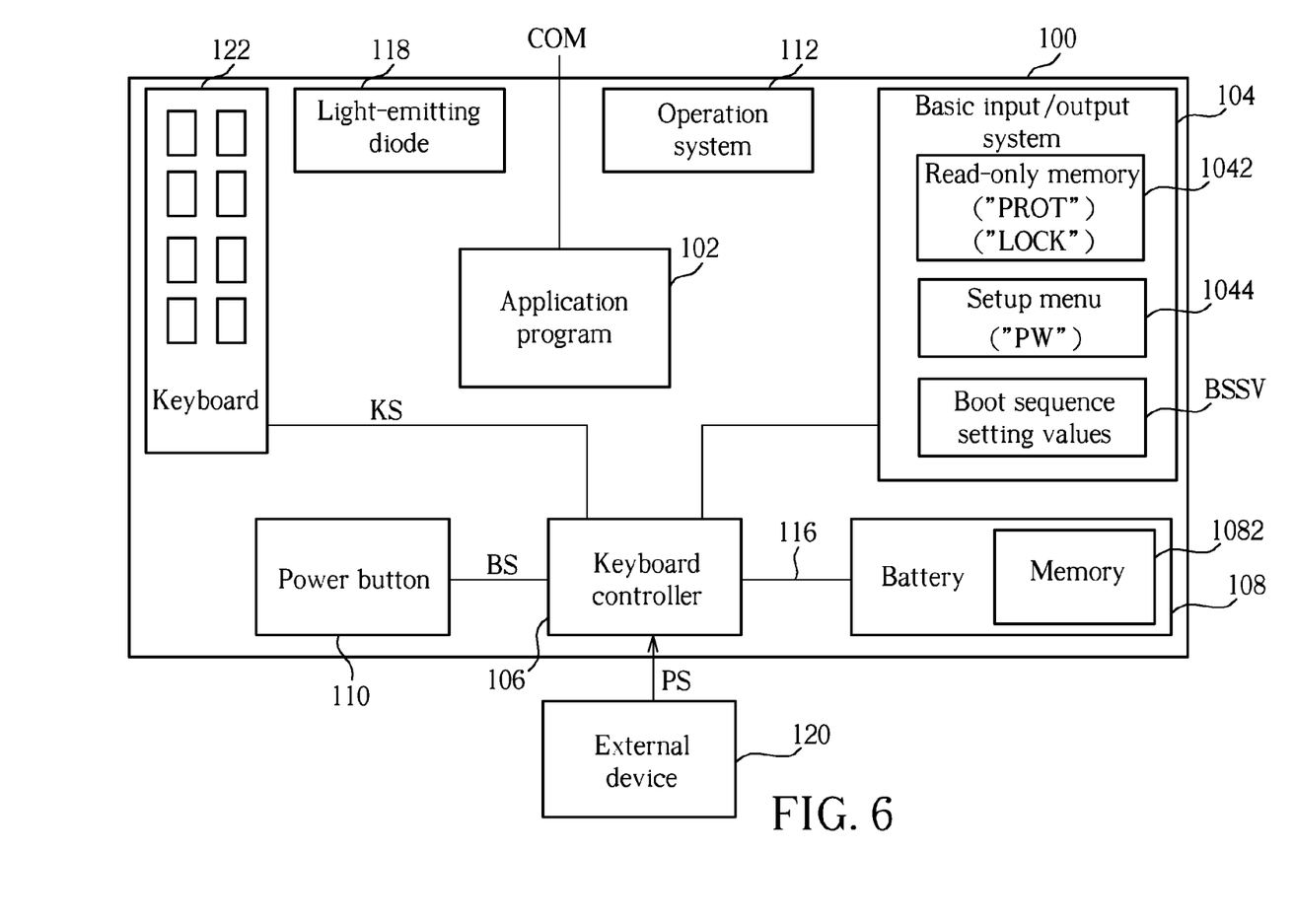
FIG. 6 is a diagram illustrating the service staff of the customer service center clearing the lock flag stored in the read-only memory of the basic input/output system according to another embodiment.

A difference between the embodiment in FIG. 4 and the embodiment in FIG. 2 is that in Step 412, when the check result of the basic input/output system 104 shows wrong passwords inputted to the portable device the predetermined number of times (such as three times), the basic input/output system 104 sets the lock flag "LOCK" in the read-only memory 1042; in Step 414, the keyboard controller 106 disables the discharge mode of the battery 108 of the portable device 100; therefore, the battery 108 of the portable device 100 does not provide power to the portable device 100; in Step 420 and Step 422, the basic input/output system 104 notifies the keyboard controller 106 to generate the alarm mode to show that the portable device 100 is in a stolen mode, and then notifies the keyboard controller 106 to turn off the portable device 100 according to the lock flag "LOCK". In addition, in Step 424 and Step 426, the owner of the portable device 100 can send the portable device 100 to the customer service center to clear the lock flag "LOCK" stored in the read-only memory 1042 of the basic input/output system 104. That is to say, a service staff of the customer service center can plug the external device 120 into the at least one pin coupled to the keyboard controller 106 for the predetermined time T. Then, the keyboard controller 106 can transmit the clear command CCOM to the basic input/output system 104 to clear the lock flag "LOCK" stored in the read-only memory 1042 of the basic input/output system 104 according to the signal PS of the at least one pin within the predetermined time T, where the external device 120 can be a Universal Serial Bus device. But, the present invention is not limited to the external device 120 being a Universal Serial Bus device. Thus, after the lock flag "LOCK" is cleared, the basic input/output system 104 can notify the operation system 112 of the portable device 100 to perform the normal boot sequence according to the boot sequence setting values BSSV of the basic input/output system 104 when the keyboard controller 106 receives a boot signal BS of the power button 110 next time. Please refer to FIG. 6. FIG. 6 is a diagram illustrating the service staff of the customer service center clearing the lock flag "LOCK" stored in the read-only memory 1042 of the basic input/output system 104 according to another embodiment. As shown in FIG. 6, the service staff of the customer service center can plug the external device 120 into the at least one pin coupled to the keyboard controller 106 for the predetermined time T. Then, the keyboard controller 106 can transmit a clear command CCOM to the basic input/output system 104 to clear the lock flag "LOCK" stored in the read-only memory 1042 of the basic input/output system 104 according to a signal PS of the at least one pin within the predetermined time T and a signal KS of at least one key of the keyboard 122. Therefore, in blocking direct current power, the embodiment in FIG. 4 utilizes the keyboard controller 106 to disable the discharge mode of the battery 108 of the portable device 100 for preventing the battery 108 from providing power to the portable device 100; in blocking alternating current power, the embodiment in FIG. 4 utilizes the basic input/output system 104 to notify the keyboard controller 106 to turn off the portable device 100 according to the lock flag "LOCK". Thus, before the lock flag "LOCK" stored in the read-only memory 1042 of the basic input/output system 104 is cleared, a present user of the portable device 100 can not utilize the direct current power and the alternating current power to power on the portable device 100.

To sum up, the security method of a portable device first enables a protection variable of the read-only memory of the basic input/output system. After the protection variable is enabled, the basic input/output system checks a password inputted to the portable device at least once whenever the portable device is powered on. When a check result shows wrong passwords inputted to the portable device a predetermined number of times, the basic input/output system notifies the keyboard controller to set a stolen flag in the memory of the battery of the portable device, or when a check result shows wrong passwords inputted to the portable device a predetermined number of times, the basic input/output system sets a lock flag in the read-only memory. After the keyboard controller sets the stolen flag in the memory of the battery of the portable device, the keyboard controller neglects a boot signal of the power button according to the stolen flag stored in the memory of the battery, or after the basic input/output system sets the lock flag in the read-only memory, the basic input/output system notifies the keyboard controller to disable the discharge mode of the battery of the portable device, and the basic input/output system notifies the keyboard controller to turn off the portable device according to the lock flag. Therefore, the present invention can ensure that the portable device is not powered on by the present user to secure data stored in the portable device when the portable device is in the stolen mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A security method of a portable device, the security method comprising:
an application program of the portable device receiving a command of an owner when the portable device is powered on;
the application program notifying a basic input/output system to set a protection variable in a read-only memory, and notifying the owner to set a password in a setup menu of the basic input/output system after the application program receives the command of the owner;
a keyboard controller turning off the portable device to enable the protection variable after the basic input/output system sets the protection variable in the read-only memory and the setup menu of the basic input/output system stores the password; and
the basic input/output system checking a password inputted to the portable device at least once according to the password and the protection variable and the basic input/output system executing a corresponding operation according to a check result whenever the portable device is powered on after the protection variable is enabled, wherein the protection variable does not check the password inputted to the portable device at least once.

2. The security method of claim 1, wherein the read-only memory is included by the basic input/output system.

3. The security method of claim 1, wherein the basic input/output system executing the corresponding operation according to the check result comprises:
the basic input/output system notifying the keyboard controller to set a stolen flag in a memory of a battery of the portable device when the check result shows wrong passwords inputted to the portable device a predetermined number of times; and
the keyboard controller turning off the portable device.

4. The security method of claim 3, wherein the memory of the battery is a flash memory.

5. The security method of claim 3, further comprising:
the keyboard controller neglecting a boot signal of a power button and generating an alarm mode to show that the portable device is in a stolen mode according to the stolen flag when the keyboard controller receives the boot signal of the power button.

6. The security method of claim 3, wherein the keyboard controller setting the stolen flag in the memory of the battery of the portable device is the keyboard controller setting the stolen flag in the memory of the battery of the portable device through a system management bus of the portable device.

7. The security method of claim 3, further comprising:
an external system management bus being coupled to the battery and transmitting a clear command to clear the stolen flag stored in the memory of the battery.

8. The security method of claim 3, further comprising:
an external device being plugged into at least one pin coupled to the keyboard controller for a predetermined time; and
the keyboard controller transmitting a clear command to the battery to clear the stolen flag stored in the memory of the battery according to a signal of the at least one pin within the predetermined time.

9. The security method of claim 8, wherein the external device is a Universal Serial Bus device.

10. The security method of claim 3, further comprising:
an external device being plugged into at least one pin coupled to the keyboard controller for a predetermined time; and
the keyboard controller transmitting a clear command to the battery to clear the stolen flag stored in the memory of the battery according to a signal of the at least one pin and a signal of at least one key of a keyboard within the predetermined time.

11. The security method of claim 10, wherein the external device is a Universal Serial Bus device.

12. The security method of claim 1, wherein the basic input/output system executing the corresponding operation according to the check result comprises:
the basic input/output system setting a lock flag in the read-only memory when the check result shows wrong passwords inputted to the portable device a predetermined number of times; and
the basic input/output system notifying the keyboard controller to disable a discharge mode of a battery of the portable device, and the keyboard controller turning off the portable device after the basic input/output system sets the lock flag in the read-only memory.

13. The security method of claim 12, further comprising:
the basic input/output system first notifying the keyboard controller to generate an alarm mode to show that the portable device is in a stolen mode, and then notifying the keyboard controller to turn off the portable device according to the lock flag when the keyboard controller receives a boot signal of a power button and the portable device is coupled to an alternating current power.

14. The security method of claim 12, further comprising:
an external device being plugged into at least one pin coupled to the keyboard controller for a predetermined time; and
the keyboard controller transmitting a clear command to the basic input/output system to clear the lock flag stored in the read-only memory of the basic input/output system according to a signal of the at least one pin within the predetermined time.

15. The security method of claim 14, wherein the external device is a Universal Serial Bus device.

16. The security method of claim 12, further comprising:
an external device being plugged into at least one pin coupled to the keyboard controller for a predetermined time; and
the keyboard controller transmitting a clear command to the basic input/output system to clear the lock flag stored in the read-only memory of the basic input/output system according to a signal of the at least one pin and a signal of at least one key of a keyboard within the predetermined time.

17. The security method of claim 16, wherein the external device is a Universal Serial Bus device.

* * * * *